Patented Sept. 4, 1951

2,566,536

UNITED STATES PATENT OFFICE 2,566,536

ALUMINUM ARTICLES COATED WITH HEAT-SEALABLE COMPOSITION

Nicholas N. T. Samaras, Monson, Mass., assignor to Monsanto Chemical Company, St. Louis, Mo., a corporation of Delaware No Drawing. Application September 10, 1948, Serial No. 48,757

5 Claims. (Cl. 117—122)

This invention relates to the preparation of coated articles. More particularly, this invention relates to the preparation of coated aluminum articles.

With the increased availability of aluminum, the possibility of using this metal for various purposes has been the subject of wide investigation. Certain of the possible uses involve coating the aluminum with an adherent film. For example, the use of aluminum foil for packaging purposes frequently necessitates applying to the foil a heat-sealable coating which is "non-blocking" under ordinary conditions, but at the same time, is highly adherent to the foil. Such coatings fulfill the function of enabling a package comprising the foil to be effectively sealed by hot pressing together two foil surfaces having an intermediate layer of the adhesive coating.

It is an object of the invention to provide coated aluminum articles. It is a particular object of this invention to provide aluminum articles with highly adhesive coatings of polyvinyl butyral-nitrocellulose compositions.

These and other objects are attained according to this invention by coating aluminum with a polyvinyl butyral-nitrocellulose composition with which is incorporated an oil-soluble phenol-formaldehyde resin.

The following examples are illustrative of the present invention, but are not to be construed as limitative thereof. Where parts are mentioned, they are parts by weight.

The method followed in the examples is to allow the nitrocellulose to soak in the ethanol until it is well softened and then to add the ethyl acetate, followed by stirring and heating until the nitrocellulose is completely dissolved. The plasticizer and the phenolic resin are then added to the nitrocellulose solution and while rapidly agitating the resulting product, the polyvinyl butyral in finely divided form is quickly added. Stirring is continued until the viscosity is too high to permit easy stirring, and then the viscous solution is allowed to stand at 50-60° C. to complete the solution of any undissolved polyvinyl butyral and to allow air bubbles to escape.

In applying the solution to aluminum foil, the foil is placed on a smooth rigid surface such as a sheet of plate glass moistened with water, toluene, alcohol or other liquid. The foil (0.001 inch thick) is smoothed out on the moistened glass and the coating solution is applied to the foil by means of a doctor blade to achieve an even coating. In the examples, the doctor blade is adjusted to give a coating thickness of 0.0015-0.002 inch after drying.

The coated foil is allowed to air dry for a short period of time until the coated surface is tack-free and then the coated foil is placed in a drier at 80° C. to remove the remaining solvent.

Prior to testing, the coated foil is conditioned by standing for at least 16 hours at 25° C. and 50% relative humidity.

For the purpose of evaluating the adhesion of the coatings of the invention, conditioned samples are cut into strips one inch wide and about 6 inches long. By moistening one end of these strips with ethyl acetate, the coating may be loosened and the stripping initiated. After severing the portion of the strip which is moistened with ethyl acetate, the specimen is clamped in a Scott L5 rubber tensile testing apparatus, in which a 15-pound spring scale has been substituted for the dial recording mechanism normally installed on this tester. The portion of the foil from which the plastic coating is stripped, as indicated above, is placed in the clamp which is attached to a 15-pound spring scale. The free plastic end is placed in the clamp on the movable carriage. The coated end of the specimen strip is held at right angles to the free foil and free plastic ends. In conducting the test, the foil is separated from the plastic at a constant rate.

The polyvinyl butyral used in the examples is made up on a weight basis of about 17–21% hydroxyl groups, calculated as polyvinyl alcohol, less than 3% acetate groups, calculated as polyvinyl acetate, and the balance substantially polyvinyl butyraldehyde acetal. It is made from a polyvinyl acetate of such a viscosity that a 7.5% solution by weight of the polyvinyl butyral in methanol has a viscosity of 160 centipoises at 20° C. Polyvinyl butyrals having other viscosities may be used, e. g., 25–300 centipoises under the same conditions.

The nitrocellulose used in the examples is of the so-called ½-second viscosity grade and contains approximately 11% nitrogen.

Example I

| | Parts |
|---|---|
| Polyvinyl butyral | 100 |
| Nitrocellulose | 25 |
| Butyl recinoleate | 25 |
| O-cresol-acetate-formaldehyde resin | 4 |
| Ethyl acetate | 50 |
| Ethanol | 400 |

The above composition, when applied to aluminum articles in accordance with the procedure set forth above, is found to have an adhesion thereto about 20% greater than that of an otherwise identical composition which does not include the phenolic resin.

Increasing the phenolic resin content to 10 parts raises the percentage increase in adhesion to about 50% and increasing the phenolic resin content to 16 parts raises the percentage increase in adhesion to 85%.

*Example II*

Example I is repeated except that the phenolic resin is a para-tertiary amyl phenol-formaldehyde resin and the phenolic resin content is 5 parts. The percentage increase in adhesion in this case is about 12%. Raising the phenolic resin content to 15 parts produces a 57% increase in adhesion.

*Example III*

Example I is repeated except that 20 parts of a ditertiary-butyl phenol-formaldehyde resin is used as the phenolic resin component. The percentage increase in adhesion of this composition is 88%.

The effect on the adhesion to aluminum of compositions of the type set forth in Example I in which various oil-soluble phenolic resins are used is set forth below.

Phenolic resin:                                  Increase in adhesion
    Para - phenethyl - phenol-formaldehyde
      resin (16 parts) _____Percent__ 18
    Phenol-acetone-formaldehyde resin (16
      parts) _____Percent__ 63
    Phenol-acetone-formaldehyde resin (12
      parts) _____Percent__ 43
    O-cresol-acetate-formaldehyde resin (12
      parts) _____Percent__ 50

The examples given below in Table A illustrate the use of varying amounts of nitrocellulose, plasticizer and phenolic resin (in this case, cresol-acetone-formaldehyde resin). The percentage increase in adhesion in each case is based on an otherwise identical composition in which no phenolic resin is used.

TABLE A

| Example | IV | V | VI | VII | VIII | IX |
|---|---|---|---|---|---|---|
| Polyvinyl butyral | 100 | 100 | 100 | 100 | 100 | 100 |
| Nitrocellulose | 25 | 30 | 35 | 25 | 30 | 35 |
| Butyl ricinoleate | 25 | 25 | 25 | 25 | 25 | 25 |
| Phenolic resin | 15 | 15 | 15 | 20 | 20 | 20 |
| Increase in adhesion_____per cent__ | 130 | 143 | 143 | 157 | 152 | 174 |

Other oil-soluble phenol-formaldehyde resins which may be used in the compositions of the invention include those marketed under the designation Bakelite X-687, Beckacite 1112, and Super-Beckacite 2000.

As indicated hereinbefore, numerous variations may be introduced into the compositions of the invention and the methods of applying the coating compositions without departing from the spirit of the invention. Thus, nitrocellulose having various viscosity characteristics may be used, for example, from ¼-second to 100-second nitrocellulose. The nitrocellulose used may be that customarily employed in either the plastics or coating industries. These nitrocellulose products usually have a nitrogen content of about 10.5–12.5%. Low viscosity, e. g., ½-second nitrocellulose, is preferred when the acetal resin has a viscosity (as defined above) of 100 centipoises or above. The viscosity values given herein for nitrocellulose are determined by A. S. T. M. method D301-33.

The polyvinyl butyrol employed may be varied substantially as regards its physical and chemical characteristics. Thus, the polyvinyl butyral may be made from polyvinyl acetate having varying viscosities, e. g., 1-molar benzene solutions thereof, may have viscosities of 5–500 centipoises at 20° C. with the result that solutions of the polyvinyl butyral vary substantially in viscosity. The hydroxyl group and ester content of the polyvinyl butyral is also subject to considerable variation. Usually, it is found that the polyvinyl butyral should contain at least 5% hydroxyl groups by weight, calculated as polyvinyl alcohol, and generally, not more than 30%. A preferred range is 10–25% hydroxyl groups, calculated as polyvinyl alcohol. The acetate or other ester group content of the polyvinyl acetal may also vary substantially. Thus, the ester group content may be entirely eliminated, or there may be as much as 30–35% ester groups by weight, calculated as polyvinyl ester.

The relative proportions of acetal resin, nitrocellulose, plasticizer and phenol-formaldehyde resin may be substantially varied as indicated by the variations which appear in the examples. Usually, it is found that at least 5 parts of a plasticizer such as butyl ricinoleate for every 100 parts of acetal resin are desirable, but for most applications, not more than 50 parts are generally used. In place of butyl ricinoleate, other plasticizers may be used, such as tricresyl phosphate, dioctyl phthalate, triethylene glycol dihexoate, dibutoxy ethyl phthalate, glyceryl monooleate etc. Also, mixtures of these and other plasticizers may be used, if desired. A preferred range of plasticizers is 20–40 parts for every 100 parts of polyvinyl butyral.

As regards the nitrocellulose content, the use of less than 15 parts for every 100 parts of acetal resin is to be avoided, in general, but satisfactory compositions may be made which contain as much as 60 parts, particularly, when a relatively high plasticizer content is used. Thus, with respect to the relative proportions of nitrocellulose and plasticizer, the amount of neither of these components should exceed the amount of the other by more than 50% for best results. A preferred range of proportions of nitrocellulose is 20–50 parts for every 100 parts of polyvinyl butyral.

The amount of the phenol-formaldehyde resin which is incorporated in the compositions of the invention may be substantially varied and still result in a significant increase in adhesion to aluminum. Generally, at least 2 parts by weight of a phenol-formaldehyde resin is incorporated for every 100 parts of polyvinyl butyral. In many cases, as the amount of the phenol resin is increased, the adhesion shows a progressive increase. However, in order to prevent deleterious effects from the use of large amounts of phenolic resins, not over 40 parts are usually employed and a preferred range of proportions is 5–30 parts for every 100 parts of polyvinyl butyral.

The phenol-formaldehyde resins may be either the non-reactive or Novolak type or the potentially reactive or resole type. They may be prepared in the presence of either an acid or basic catalyst in accordance with procedures well known to those skilled in the art.

As indicated by the variations which appear in the examples, the oil-soluble phenol-formaldehyde resins used in the compositions of the invention may be made from various phenols. As is well known to those skilled in the art, an important class of such resins comprises those made from hydroxy benzene which contains a hydrocarbon substituent containing at least three carbon atoms in one of the reactive positions, preferably, the position para to the hydroxy group. Examples of such phenols include para-phenyl phenol, para-propyl phenol, para-tertiary-amyl phenol, para-chlorphenyl phenol, para-tertiary butyl phenol, ortho-phenyl phenol, para-diphenyl ethyl phenol.

While the oil-soluble resins may be made in the presence of either an alkaline or an acid catalyst, according to a preferred embodiment of the invention, these resins are made in the presence of an acid catalyst. Compositions which include these resins are characterized by extreme resistance to loss of heat-sealing properties on standing and/or heating, coupled with outstanding adhesion to aluminum.

Although the invention has been illustrated with respect to aluminum foil having a thickness of 0.001 inch, it is obvious that aluminum articles having other thicknesses and/or other shapes may be coated in accordance with the invention to provide adherent coatings therefor having heat-sealable properties.

The thickness of the coating which is applied to the aluminum foil or other aluminum article may also be varied to meet particular requirements. However, for most requirements, a thickness of 0.0005–0.005 inch is sufficient.

In place of the mixture of ethanol and ethyl acetate used in the examples, other solvents for the components of the coating composition may be used. For example, the ratio of ethanol to ethyl acetate may be raised as high as 99:1, or ethanol alone may be used. Also, along with the ethanol and ethyl acetate, such solvents may be incorporated as isopropanol, amyl alcohol, butanol, hexanol, octanol, toluene, etc. Other suitable solvents will be apparent to those skilled in the art.

In addition to the exceptional adhesion to aluminum of the coatings of the invention, they are characterized by the ability to heat seal in a short time (3–10 seconds) under moderate pressures (1–3 pounds per square inch) and elevated temperatures, e. g., 175° C. Furthermore, these coatings are "non-blocking" at ordinary temperatures (or even at moderately raised temperatures), i. e., they do not prematurely adhere, for example, when articles coated therewith are in storage.

Another valuable property of the coating compositions is their excellent strength characteristics as reflected in the high tensile strength of free films thereof and their high heat seal strength.

While the invention has been illustrated by examples showing incorporation of the individual components of the compositions in the solvent, other procedures may be used for combining the several ingredients. For example, the butyl ricinoleate or other plasticizer may be admixed with the polyvinyl butyral and the resulting plasticized polyvinyl butyral and the phenolic resin then admixed with the nitrocellulose solution. It is preferred to dissolve the nitrocellulose in the solvent or one or more components thereof, rather than attempt to dissolve the nitrocellulose in a solution of the polyvinyl butyral. A further alternative is to dissolve separately the nitrocellulose and the polyvinyl butyral and then combine the solutions. The plasticizer and the phenolic resin may be incorporated in either solution, or partly in both.

Instead of applying the compositions on the aluminum from solution, they may be applied in the absence of solvent by the application of heat, with or without pressure. Of course, in the preparation of the compositions, a certain amount of solvent is desirable for purposes of safety while incorporating the nitrocellulose. This solvent may be eliminated before or after the application to the aluminum.

When the term "phenol" is used herein, it is used in the generic sense and not to represent hydroxy benzene.

Aluminum articles coated with polyvinyl butyral-nitrocellulose compositions containing glyceryl mono-oleate and butyl ricinoleate are described and claimed in co-pending applications Serial Number 48,754, and Serial Number 48,753, respectively, filed September 10, 1948, in the name of George H. Bischoff.

It is obvious that many variations may be made in the products and processes of this invention without departing from the spirit and scope thereof as defined in the appended claims.

What is claimed is:

1. An aluminum article having a highly adhesive heat-sealable coating thereon comprising, on a weight basis, 100 parts of polyvinyl butyral, 15–60 parts of nitrocellulose, 5–50 parts of a plasticizer taken from the group consisting of butyl ricinoleate, tricresyl phosphate, dioctyl phthalate, triethylene glycol dihexoate, dibutoxy ethyl phthalate and glyceryl mono-oleate and 2–40 parts of an oil-soluble phenol-formaldehyde resin.

2. A product as defined in claim 1 in which the aluminum article is an aluminum foil.

3. A product as defined in claim 2 in which the oil-soluble phenol-formaldehyde resin is an acid catalyzed phenolic resin.

4. A product as defined in claim 3 in which the phenolic resin is a phenol-acetone-formaldehyde resin.

5. A product as defined in claim 3 in which the phenolic resin is a cresol-acetone-formaldehyde resin.

NICHOLAS N. T. SAMARAS.

REFERENCES CITED

The following references are of record in the file of this patent:

UNITED STATES PATENTS

| Number | Name | Date |
|---|---|---|
| 2,147,772 | Kallander | Feb. 21, 1939 |
| 2,166,856 | Blaikie | July 18, 1939 |
| 2,307,588 | Jackson | Jan. 5, 1943 |
| 2,433,097 | Debacher | Dec. 23, 1947 |
| 2,442,936 | Rohdin | June 8, 1948 |

Certificate of Correction

Patent No. 2,566,536 September 4, 1951

NICHOLAS N. T. SAMARAS

It is hereby certified that error appears in the printed specification of the above numbered patent requiring correction as follows:

Column 2, line 49, and column 3, line 36, for "O-cresol-acetate-formaldehyde resin" read *O-cresol-acetone-formaldehyde resin*; column 4, line 1, for "butyrol" read *butyral*;

and that the said Letters Patent should be read as corrected above, so that the same may conform to the record of the case in the Patent Office.

Signed and sealed this 20th day of November, A. D. 1951.

[SEAL]

THOMAS F. MURPHY,
*Assistant Commissioner of Patents.*

Certificate of Correction

Patent No. 2,566,536                      September 4, 1951

NICHOLAS N. T. SAMARAS

It is hereby certified that error appears in the printed specification of the above numbered patent requiring correction as follows:

Column 2, line 49, and column 3, line 36, for "O-cresol-acetate-formaldehyde resin" read *O-cresol-acetone-formaldehyde resin*; column 4, line 1, for "butyrol" read *butyral*;

and that the said Letters Patent should be read as corrected above, so that the same may conform to the record of the case in the Patent Office.

Signed and sealed this 20th day of November, A. D. 1951.

[SEAL]

THOMAS F. MURPHY,
*Assistant Commissioner of Patents.*